(No Model.) 2 Sheets—Sheet 1.
B. HUDSON.
CORN HARVESTER.
No. 457,424. Patented Aug. 11, 1891.
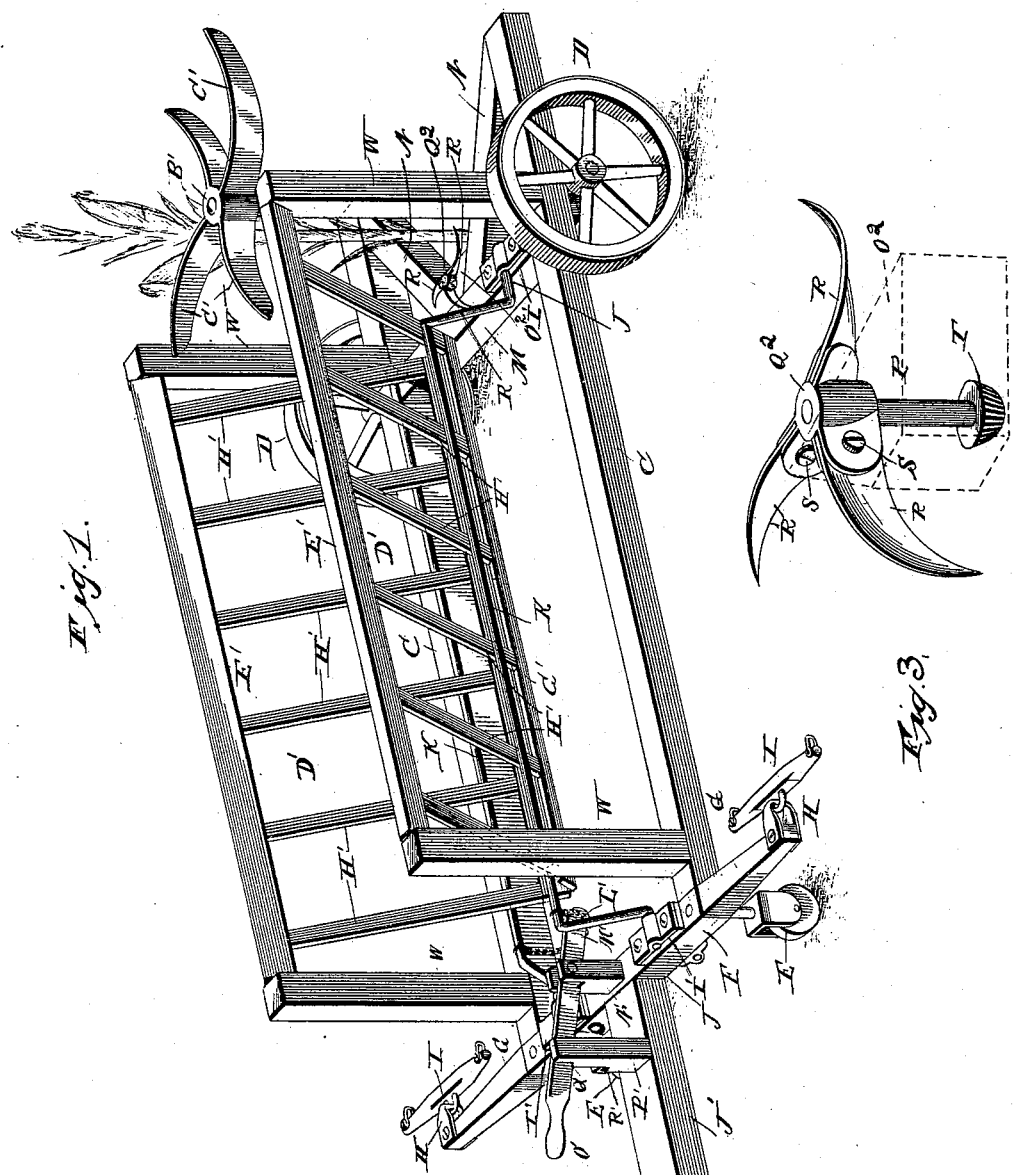
Witnesses
Geo. M. Thorpe
Jno. L. Condon
Inventor
B. Hudson
By his Attorneys
Higdon & Higdon

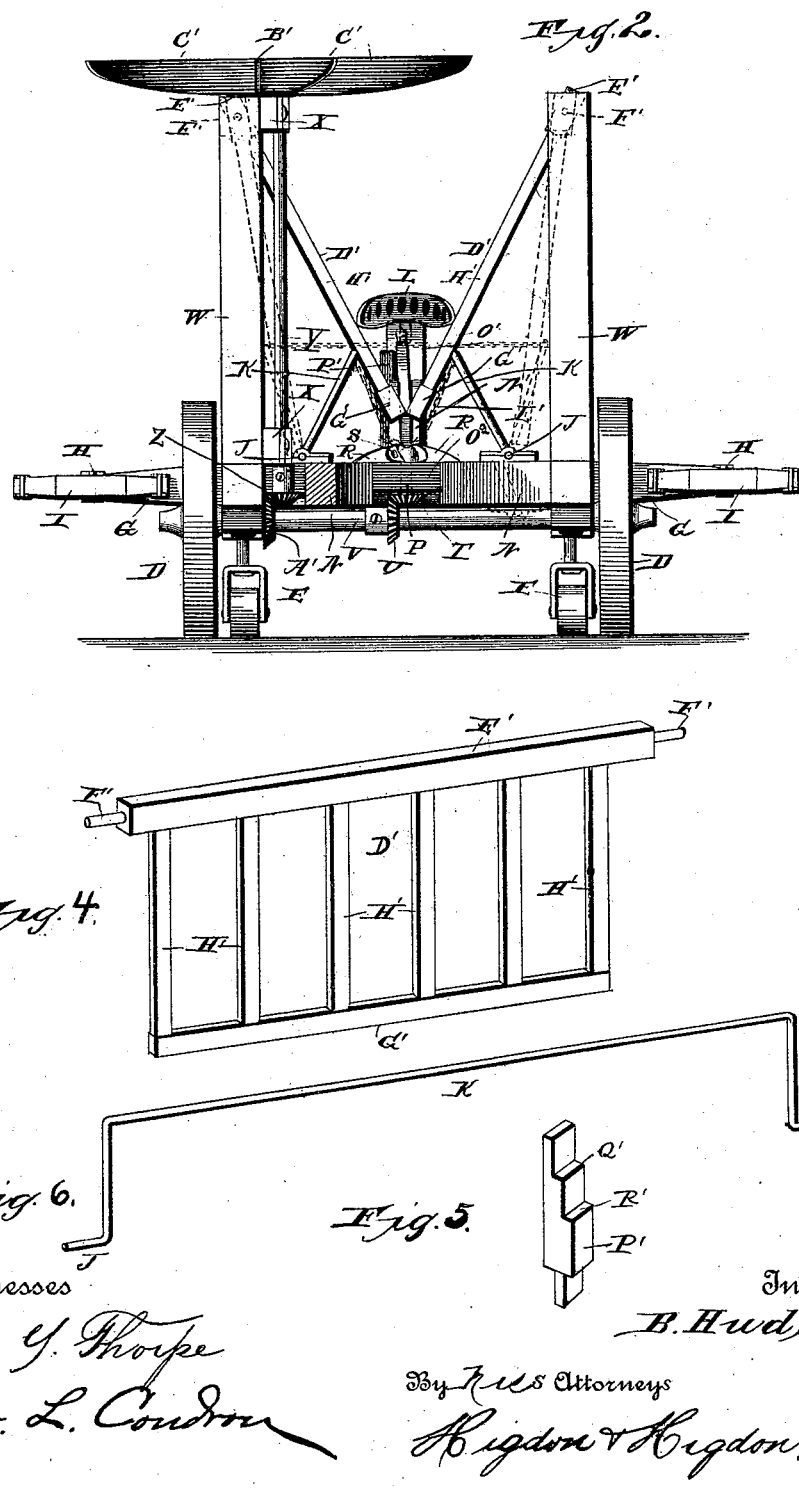

UNITED STATES PATENT OFFICE.

BANNUS HUDSON, OF FORT SCOTT, KANSAS.

CORN-HARVESTER.

SPECIFICATION forming part of Letters Patent No. 457,424, dated August 11, 1891.

Application filed February 13, 1891. Serial No. 381,338. (No model.)

*To all whom it may concern:*

Be it known that I, BANNUS HUDSON, of Fort Scott, Bourbon county, Kansas, have invented certain new and useful Improvements in Corn-Harvesters, of which the following is a full, clear, and exact description, reference being had to the accompanying drawings, forming a part hereof.

My invention relates to machines for harvesting cornstalks, or what is known as "fodder-corn," in the field; and the object of my invention is to provide a simple, durable, and inexpensive machine, which shall quickly cut and gather the cornstalks and form them into bundles to be dropped upon the ground at intervals, as desired for gathering; furthermore, to provide a machine which can be readily propelled over the field and which can be managed by a single attendant.

To the above purposes my invention consists in certain peculiar and novel features of construction and arrangement, as hereinafter described, and pointed out in the appended claim.

In order that my invention may be fully understood, I will proceed to describe it with reference to the accompanying drawings, in which—

Figure 1 is a perspective view of a cornstalk-harvester constructed in accordance with my invention. Fig. 2 is a front elevation of the same, one of the guides being partially broken away. Fig. 3 is a detached perspective view of the improved cutting mechanism. Fig. 4 is a detached perspective view of one of the swinging bundle-dropping frames. Fig. 5 is a detached perspective view of the post for supporting the rear end of the dumping-lever. Fig. 6 is a detached perspective view of one of the connecting-bars for actuating the bundle-dropping frames.

In the drawings, C C designate two reaches which constitute the sides of the harvester-frame, and to the rear ends of which is connected a transversely-extending beam F, the ends of which protrude beyond the other sides of the reaches C. This rear beam F is supported upon two caster-wheels E, which are swiveled upon the cross-beam near its outer ends. To the outer ends G of the cross-beam are attached by clips H two singletrees I, the arrangement being such that the draft-animals travel beside the machine and draw the same from the rear. At the front portions the reaches C are connected by a cross-beam M, immediately beneath which is placed the front axle V of the machine. Upon the ends of this front axle V are mounted carrying-wheels D, which thus support the front of the harvester. The front ends of the reaches C extend forward beyond the front cross-beam M, and to the inner side of the extremity of each of said reaches is secured a guide-bar N, which extends horizontally rearward and inward, and the rear end of each of which guides is secured to the front side of the cross-beam M near the middle thereof. It will thus be seen that these two guide-bars converge toward each other rearwardly, and serve to gather the stalks toward the rotary cutters, to be hereinafter described.

Upon the upper sides of the reaches C, at the front and rear portions thereof, are secured vertical standards W, there being thus two such standards so secured to each reach. Between each pair of these standards W is placed a rectangular skeleton frame D', composed of a horizontal top rail E', a horizontal bottom rail G', and a number of vertical bars H', connecting the said top and bottom rails. The top rails E' are each formed with reduced ends F', which enter recesses in the standards W, and thus pivotally connect the frames to said standards.

K designates two elongated metal rods, which are of U form, and the angular ends J of each of which extend beneath bearing-boxes I', secured to the upper sides of the rear and front cross-beams F and M, near the outer ends thereof. It will thus be seen that each of the rods K extends longitudinally of the vehicle-frame and that its middle portion lies against the outer side of the lower portion of each swinging frame D'.

Upon the upper side of the rear cross-beam F, midway of the length of the same, is secured a vertical standard N', in the bifurcated upper end of which is pivoted a lever O, which extends longitudinally of the vehicle. To the front end M' of this lever is attached a chain or similar flexible connection L', the outer ends of which are connected to the rods K at the rear ends of their body portions. The arrangement is such that by raising the rear end O' of the lever O and so depressing its front end the rods K are caused to approach each other and thus similarly swing the frames D', for a purpose to be presently explained. This lever is supported in the raised position by engagement with one or another of several shoulders Q' R', which are formed upon a post P', the said post being secured to the upper side of a beam J', which extends horizontally rearward from the middle of the rear crossbeam F. Upon the rear end of this beam J' is mounted a seat L for the driver, and the handle O' at the rear end of the lever extends within convenient reach of the driver when seated upon the seat L.

At the front of the machine is mounted a vertical shaft Y, which works in bearing-boxes X, secured to the inner side of the front right-hand standard W, and which carries at its upper end the gatherer. This gatherer consists of a hub B', surrounding the upper end of the shaft Y and provided with a number of radially-extending horizontal arms C'. At its lower end the shaft Y carries a beveled gear-pinion Z, which meshes with a similar pinion A', which is mounted upon and turns with the axle V. It will thus be seen that the machine is propelled forward, the cornstalks are guided toward the revolving gatherer by the guides N, and that the gatherer inclines the stalks rearwardly, so that when severed they shall fall between the swinging frames D'.

P designates a second vertical shaft, which extends through a triangular block $O^2$, interposed between the inner ends of the guides N, and the lower end of which carries a beveled gear-pinion T, which meshes with a similar pinion U, mounted upon and turning with the axle V. At its upper end this shaft P carries a hub $Q^2$, having radial ears, to which are secured by screws S the inner ends of a number of radial cutting-blades R. Each of these blades is twisted longitudinally, and by virtue of this twisted form the blades operate upon the cornstalks with a shearing or drawing cut, which insures a rapid and certain severance of the stalks.

From the above description it will be seen that when the machine is started the swinging frames are drawn together at their lower parts by lifting the rear end of the lever O. The guides direct the cornstalks to the gatherer and cutters and the gatherer inclines the stalks inward. The cutters immediately sever the stalks and the latter fall between the swinging frames D'. When a sufficient number of the stalks have thus been gathered between the swinging frames D', the lever O is depressed at its rear end, causing the lower parts of the swinging frames to separate, and thus permitting the bundle of stalks to fall upon the ground.

The machine is simple, durable, and inexpensive in construction, and is easily operated by the attendant.

Having thus described my invention, what I claim as new therein, and desire to secure by Letters Patent, is—

An improved cornstalk-harvester, comprising a pair of longitudinal side beams C, a cross-beam F, connecting the rear ends of the side beams and projecting outwardly beyond the latter to receive a pair of singletrees, a beam J', projecting rearwardly from the middle of the cross-beam F and carrying a vertical post P', having shoulders Q' R', a cross-beam M, connecting the front portions of the side beams, a pair of beams N, connected at their front ends to the front extremities of the side beams and converging rearwardly and connected at their rear ends to the cross-beam M, uprights W upon the side beams C, swinging frames pivoted at their upper parts in the upper ends of the uprights W, a pair of crank-rods K, journaled at their ends upon the front and rear cross-beams and engaging the outer sides of the swinging frames, a lever pivoted upon the rear cross-beam and engaging the shouldered post at its rear portion, a flexible connection L', connecting the front end of the lever with the crank-rods, caster-wheels supporting the ends of the rear cross-beam, an axle journaled beneath the front cross-beam and carrying two beveled gears A' and U, a rotary cutter-shaft journaled vertically in the front cross-beam at the point of juncture of the convergent beams N therewith and carrying a cutter at its upper end and a beveled gear-wheel at its lower end, and a reel-shaft mounted vertically at one end of the front cross beam and carrying a reel at its upper end and a beveled gear at its lower end, the said beveled gears meshing with those upon the front axle, substantially as set forth.

In testimony whereof I affix my signature in presence of two witnesses.

BANNUS HUDSON.

Witnesses:
R. Y. HUMPHREY,
J. M. HUMPHREY.